US008860262B2

(12) United States Patent
Kim (10) Patent No.: US 8,860,262 B2
(45) Date of Patent: Oct. 14, 2014

(54) LINEAR VIBRATION MOTOR HAVING ELASTIC MEMBER INCLUDING BENDING PART

(75) Inventor: Yong Jin Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 224 days.

(21) Appl. No.: 13/409,734

(22) Filed: Mar. 1, 2012

(65) Prior Publication Data

US 2013/0134804 A1    May 30, 2013

(30) Foreign Application Priority Data

Nov. 24, 2011    (KR) .................. 10-2011-0123725

(51) Int. Cl.
*H02K 33/00*    (2006.01)
*H02K 7/06*    (2006.01)

(52) U.S. Cl.
USPC ............... 310/25; 310/15; 310/36; 310/81

(58) Field of Classification Search
CPC .................... H02K 33/00; B06B 1/45
USPC ................ 310/15, 36, 51, 81, 25; 381/396
See application file for complete search history.

(56) References Cited

U.S. PATENT DOCUMENTS

| 2011/0089773 A1* | 4/2011 | Choi ........................... 310/25 |
| 2011/0193426 A1* | 8/2011 | Chung et al. ............... 310/25 |
| 2012/0119595 A1* | 5/2012 | Choi et al. .................. 310/25 |
| 2013/0033127 A1* | 2/2013 | Park ............................. 310/25 |

FOREIGN PATENT DOCUMENTS

| KR | 10-1046003 B1 | 6/2011 |
| KR | 10-1055562 B1 | 8/2011 |

* cited by examiner

*Primary Examiner* — Tran Nguyen
*Assistant Examiner* — Jose Gonzalez Quinones
(74) *Attorney, Agent, or Firm* — Ladas & Parry LLP (57) ABSTRACT

Disclosed herein is a linear vibration motor including: a stator part including a magnet; a vibrator part including a coil disposed to face the magnet; and an elastic member connecting the stator part and the vibrator part to each other, wherein the elastic member includes bending parts formed in connection parts thereof connected to the stator part and the vibration part in a vibration direction of the vibrator part.

11 Claims, 6 Drawing Sheets

LINEAR VIBRATION MOTOR HAVING ELASTIC MEMBER INCLUDING BENDING PART

CROSS REFERENCE TO RELATED APPLICATION

This application claims the benefit of Korean Patent Application No. 10-2011-0123725, filed on Nov. 24, 2011, entitled "Linear Vibration Motor", which is hereby incorporated by reference in its entirety into this application.

BACKGROUND OF THE INVENTION

1. Technical Field

The present invention relates to a linear vibration motor.

2. Description of the Related Art

Generally, a vibration motor, which is a component converting electrical energy into mechanical vibration using a principle of generating electromagnetic force, is mounted in a mobile communication terminal, a portable terminal, and the like, to be used for silently notifying a user of call reception.

Further, in a situation in which small-sized and high quality components are required in a mobile communication terminal in accordance with the trend in which a multi-functional mobile communication terminal has been prominent due to the rapid expansion in wireless communication and mobile phone markets, performance and a technology of a vibration motor has also been developed daily in order to overcome a disadvantage of an existing product and significantly improve quality.

In addition, as the release of a cellular phone having a large-sized liquid crystal display (LCD) screen has rapidly increased in recent years, a touch screen scheme has been used. As a result, the linear vibration device has been used to generate vibration at the time of touch, such that the demand thereof has increased.

Meanwhile, performance particularly required in the vibration according to the touch of the touch screen is as follows. First, as the number of vibration generations according to the touch becomes larger than that of vibration generations at the time of call reception, an operating lifespan needs to increase. Second, in order to allow users to feel the vibration at the time of touch, a response speed of the vibration needs to increase in accordance with a touch speed of the screen.

The linear vibration motor mainly used according to the prior art has used a scheme of generating rotational force to rotate a rotor part having unbalanced mass, thereby obtaining mechanical vibration and generates the rotational force by supplying current to a rotor coil through a rectifying action by contact between a brush and a commutator.

However, in a brush type structure using the commutator as described above, at the time of rotation of the motor, the brush causes mechanical friction and electrical spark while passing through a gap between the commutator and a segment to lead to abrasion and foreign materials such as black powders, or the like, thereby reducing a lifespan of the motor.

In addition, a time is required to arrive at a target vibration amount due to rotation inertia at the time of application of voltage to the vibration motor, such that it is difficult to implement vibration appropriate for a touch screen phone.

A linear vibration motor, which is a vibration motor capable of satisfying the above-mentioned characteristics, has a resonant frequency determined by a spring and a vibrator part connected to the spring and is oscillated by electromagnetic force to thereby generate vibration. In addition, the electromagnetic force is generated by the interaction between a magnet of the vibrator part and current applied to a coil of a stator part and having a predetermined frequency.

Further, the vibrator part of the linear vibration motor does not use a rotation principle of the motor but is oscillated by electromagnetic force having a resonant frequency determined using a spring, which is an elastic member installed in the vibrator part and a weight body hung on the spring to thereby generate vibration.

As a result, the spring connects a case or a bracket, which is the stator part, and the weight body, which is the vibrator part, to each other and determines the resonant frequency together with the weight of the weight body.

However, the spring includes frequencies that are multiple components other than the resonant frequency, and the spring repeatedly extended and compressed also generates frequencies that are not the multiple components at the time of being touched to the weight body. Therefore, the frequencies that are the multiple components and the frequencies that are not the multiple components have an effect on the resonant frequency, such that a desired vibration displacement may not be obtained and noise may be caused. In accordance with sliminess and lightness, as a design margin of the spring becomes short, the noise increases.

Figure 8:
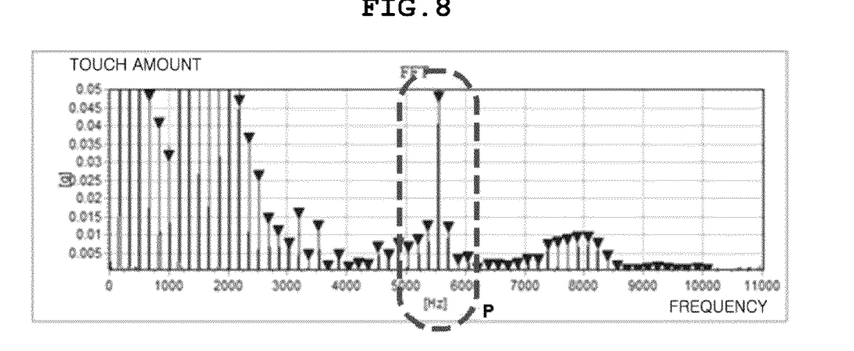
FIG. 8 is a graph showing a touch amount according to a frequency of a linear vibration motor according to the prior art.

FIG. 8 is a graph showing a touch amount according to a frequency of a linear vibration motor according to the prior art. It could be appreciated that in the linear vibration motor in which a connection piece between an inner ring and an outer ring includes four elastic members, a peak (part P) by a touch of the elastic member occurs at a frequency between 5 to 6 kHz.

As a result, the linear vibration motor according to the prior art is repeatedly extended and compressed at the time of linear vibration, such that a touch sound occurs between the linear vibration motor and a stator part or a vibration part connected to the linear vibration motor.

SUMMARY OF THE INVENTION

The present invention has been made in an effort to provide a linear vibration motor capable of having improved quality and performance by smoothly securing vibration and reducing noise through optimal design of an elastic member mounted in the linear vibration motor.

According to a preferred embodiment of the present invention, there is provided a linear vibration motor including: a stator part including a magnet; a vibrator part including a coil disposed to face the magnet; and an elastic member connecting the stator part and the vibrator part to each other, wherein the elastic member includes bending parts formed in connection parts thereof connected to the stator part and the vibration part in a vibration direction of the vibrator part.

The elastic member may include an outer ring coupled to the stator part, an inner ring disposed at an inner side of the outer ring and connected to the vibrator part, and connection pieces connecting the outer ring and the inner ring to each other.

The connection piece may include: an inner side connection part connected to the inner ring; an outer side connection part connected to the outer ring; and a connection ring part connecting the inner side connection part and the outer connection part to each other.

The inner side connection part may be provided with an upward bending part in the vibration direction of the vibrator part, and the outer side connection part may be provided with a downward bending part in the vibration direction of the vibrator part.

The inner side connection part may be provided with an upward bending part in the vibration direction of the vibrator part, or the outer side connection part may be provided with a downward bending part in the vibration direction of the vibrator part.

Each of the inner side connection part and the outer side connection part may have an area wider than that of the connection ring part.

The number of connection pieces connecting the inner ring and the outer ring to each other may be three.

The stator part may include: a case provided with an internal space receiving the vibrator part therein and provided with an open part; a bracket coupled to the case so as to cover the open part of the case; and at least one magnet mounted on the case and the bracket.

The magnet may include: a first magnet coupled to one surface of the case; and a second magnet facing the first magnet and coupled to one surface of the bracket.

The stator part may further include a yoke plate selectively mounted on one surface of the first magnet or the second magnet facing each other.

The vibrator part may include: a coil disposed to face the magnet; and a weight body coupled to the coil.

The vibrator part may further include a circular yoke coupled to an outer peripheral surface of the coil.

The elastic member may be coupled to the coil or the weight body.

The elastic member may be coupled to the circular yoke.

Each of the coil and the weight body may be provided with a hollow part so as to be linearly movable in a state in which the stator part is disposed therein.

According to another preferred embodiment of the present invention, there is provided a linear vibration motor including: a stator part including a coil and a printed circuit board coupled to the coil; a vibrator part including a magnet disposed to face the coil and a weight body coupled to the magnet; and an elastic member connecting the stator part and the vibrator part to each other, wherein the elastic member includes bending parts formed in connection parts thereof connected to the stator part and the vibration part in a vibration direction of the vibrator part.

The stator part may further include a bracket having the printed circuit board fixedly coupled thereto and a case provided with an internal space so as to cover the vibrator part and coupled to the bracket.

The elastic member may include an outer ring coupled to the stator part, an inner ring disposed at an inner side of the outer ring and connected to the vibrator part, and connection pieces connecting the outer ring and the inner ring to each other.

The connection piece may include: an inner side connection part connected to the inner ring; an outer side connection part connected to the outer ring; and a connection ring part connecting the inner side connection part and the outer connection part to each other.

The inner side connection part may be provided with an upward bending part in the vibration direction of the vibrator part, and the outer side connection part may be provided with a downward bending part in the vibration direction of the vibrator part.

The inner side connection part may be provided with an upward bending part in the vibration direction of the vibrator part, or the outer side connection part may be provided with a downward bending part in the vibration direction of the vibrator part.

DESCRIPTION OF THE PREFERRED EMBODIMENTS

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, a linear vibration motor according to preferred embodiments of the present invention will be described in detail with reference to the accompanying drawings.

Figure 1:
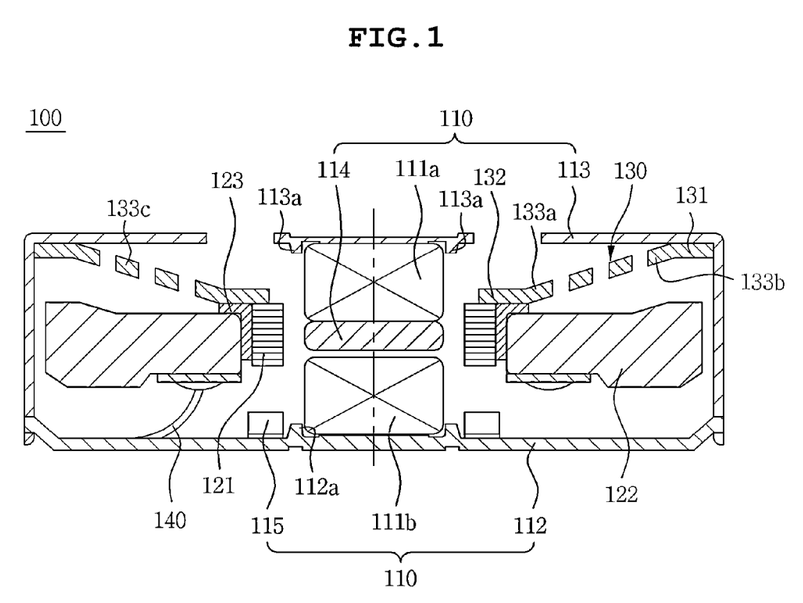
FIG. 1 is a cross-sectional view schematically showing a linear vibration motor according to a first preferred embodiment of the present invention.
Figure 2:
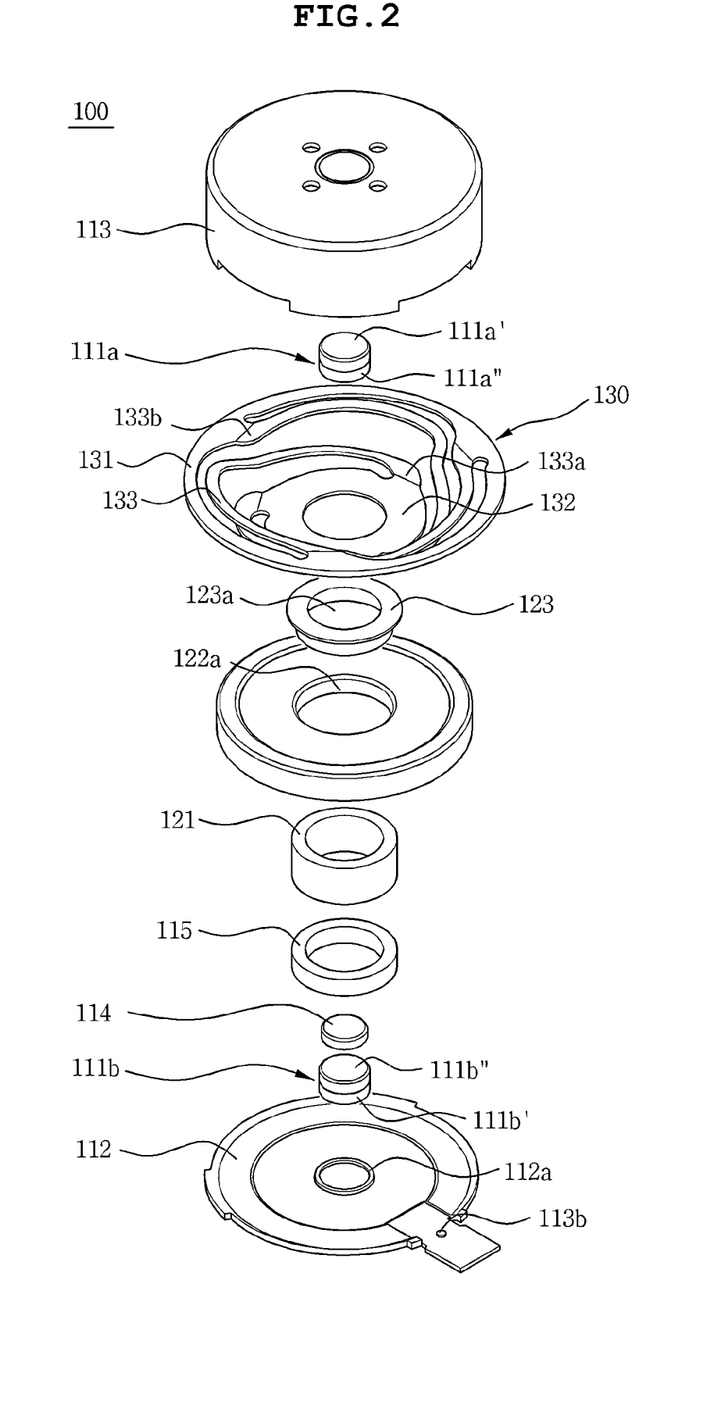
FIG. 2 is a schematic exploded perspective view of the linear vibration motor shown in FIG. 1.

FIG. 1 is a cross-sectional view schematically showing a linear vibration motor according to a first preferred embodiment of the present invention; and FIG. 2 is a schematic exploded perspective view of the linear vibration motor shown in FIG. 1.

The linear vibration motor according to the present invention is configured to include a stator part including a magnet, a vibration part including a coil facing the magnet, and an elastic member connecting the stator part and the vibrator part to each other, wherein the elastic member includes bending parts formed in connection parts thereof connected to the stator part and the vibration part in a vibration direction of the vibrator part.

More specifically, the linear vibration motor 100 according to the first preferred embodiment of the present invention is configured to include: a stator part 110 including magnets 111a and 111b, a bracket 112, a case 113, a yoke plate 114, and a damping member 115; a vibrator part 120 including a coil 121, a weight body 122, and a circular yoke 123; and an elastic member 130 connecting the stator part and the vibrator part to each other as shown.

Hereinafter, in the linear vibration motor 100, shapes of the respective components and systematic coupling therebetween will be described in detail.

First, in the stator part, the case 113 is provided with an internal space so as to receive the vibrator part therein and is provided with an open part. In addition, the bracket 112 is coupled to the case while covering the open part of the case 113. Further, the magnets 111a and 111b, which are to vibrate the vibrator part by electromagnetic force with the coil 121, are disposed to face the coil of the vibrator part and are mounted on one surface of the bracket 112 and one surface of the case 113, respectively.

In addition, the magnets 111a and 111b includes a first magnet 111a coupled to one surface of the case 113 and a second magnet 111b facing the first magnet and coupled to one surface of the bracket 112.

In addition, the first magnet 111a and the second magnet 111b may be configured so that surfaces thereof facing each other have the same polarity in order to increase magnetic efficiency.

That is, as shown in FIG. 2, the first magnet 111a includes an S pole 111a' and an N pole 111a" which are two poles having different polarities, and the second magnets 111b includes an S pole 111b' and an N pole 111b" which are two poles having different polarities, wherein the N pole 111a" and the N pole 111b" are disposed to face each other.

In addition, each of the case 113 and the bracket 112 may be provided with seat parts 112a and 113a in order to stably and firmly couple the magnets 111a and 111b thereto.

Further, the yoke plate 114 may be selectively coupled to a lower portion of the first magnet 111a or an upper portion of the second magnet 111b in the vibration direction of the vibrator part. FIG. 1 shows that the yoke plate 114 is coupled to the lower portion of the first magnet 111a.

In addition, the stator part 110 may further include the damping member 115 mounted on the bracket 112 so as to face the vibrator part.

Next, in the vibrator part 120, the coil 121 is disposed to face the magnets 111a and 111b of the stator part. More specifically, the coil 121 is provided with a hollow part 121a, which is disposed so that the magnets 111a and 111b are positioned therein.

Further, the weight body 122 is directly coupled to an outer peripheral surface of the coil 121 or is indirectly coupled thereto by the circular yoke 123. In addition, to this end, the weight body 122 is provided with a hollow part 122a.

Further, a wire 140 for supplying current to the coil 121 may be connected to the vibrator part and be connected to the coil through the weight body 122.

In the linear vibration motor 100 according to the first preferred embodiment of the present invention, the elastic member 130 has one end coupled to the case 113, which is the stator part, and the other end coupled to the coil 121, which is the vibrator part. In addition, the other end of the elastic member 130 coupled to the vibrator part may be coupled to the circular yoke 123 or be coupled to both of the coil 121 and the circular yoke 123 as shown in FIG. 1.

Further, the circular yoke 123, which is to prevent leakage of electromagnetic force by the magnet and the coil, is coupled to an outer peripheral surface of the coil. To this end, the circular yoke 123 is provided with a hollow part 123a. In addition, the circular yoke 123 may be coupled between the coil 121 and the weight body 122. Further, the circular yoke 123 may be insertedly coupled to the hollow part 122a of the weight body 122 while partially covering an upper portion of the weight body 122, as shown in FIG. 1.

As a result, linear vibration is conducted in a state in which the circular yoke 123 and the coil 121 are coupled to the hollow part 122a of the weight body 122 and the magnets 111a and 111b and the yoke plate 114, which are components of the stator part, are positioned in the hollow part 122a.

Hereinafter, the elastic member according to the preferred embodiment of the present invention will be described in detail with reference to FIG. 3. As shown, the elastic member 130 includes an outer ring 131, an inner ring 132, and connection pieces 133. More specifically, the outer ring 131 is coupled to the stator and has a diameter larger than that of the inner ring 132 so that the inner ring 132 is positioned therein. In addition, the inner ring 132 is coupled to the vibrator part and is disposed at an inner portion of the outer ring 131. Further, the connection piece 133 connects the inner ring 132 and the outer ring 131 to each other. That is, an outer side part of the inner ring 132 and an inner side part of the outer ring 131 are connected to each other by the connection piece 133.

In addition, the connection piece 133 includes an inner side connection part 133a connected to the inner ring 132, an outer side connection part 133b connected to the outer ring 131, and a connection ring part 133c connecting the inner side connection part 133a and the outer connection part 133b to each other. Further, each of the inner side connection part 133a and the outer side connection part 133b may have an area wider than that of the connection ring part 133c in consideration of mechanical strength of the elastic member. In addition, the inner side connection part 133a is formed as an upward bending part in the vibration direction of the vibrator part, and the outer connection part 133b is formed as a downward bending part in the vibration direction of the vibrator part, as shown in FIG. 1 and as an enlarged view in FIG. 3.

In addition, bent angles of the upward bending part of the inner side connection part 133a and the downward bending part of the outer connection part 133b may be variously designed according to characteristics and products of the motor.

Figure 3:
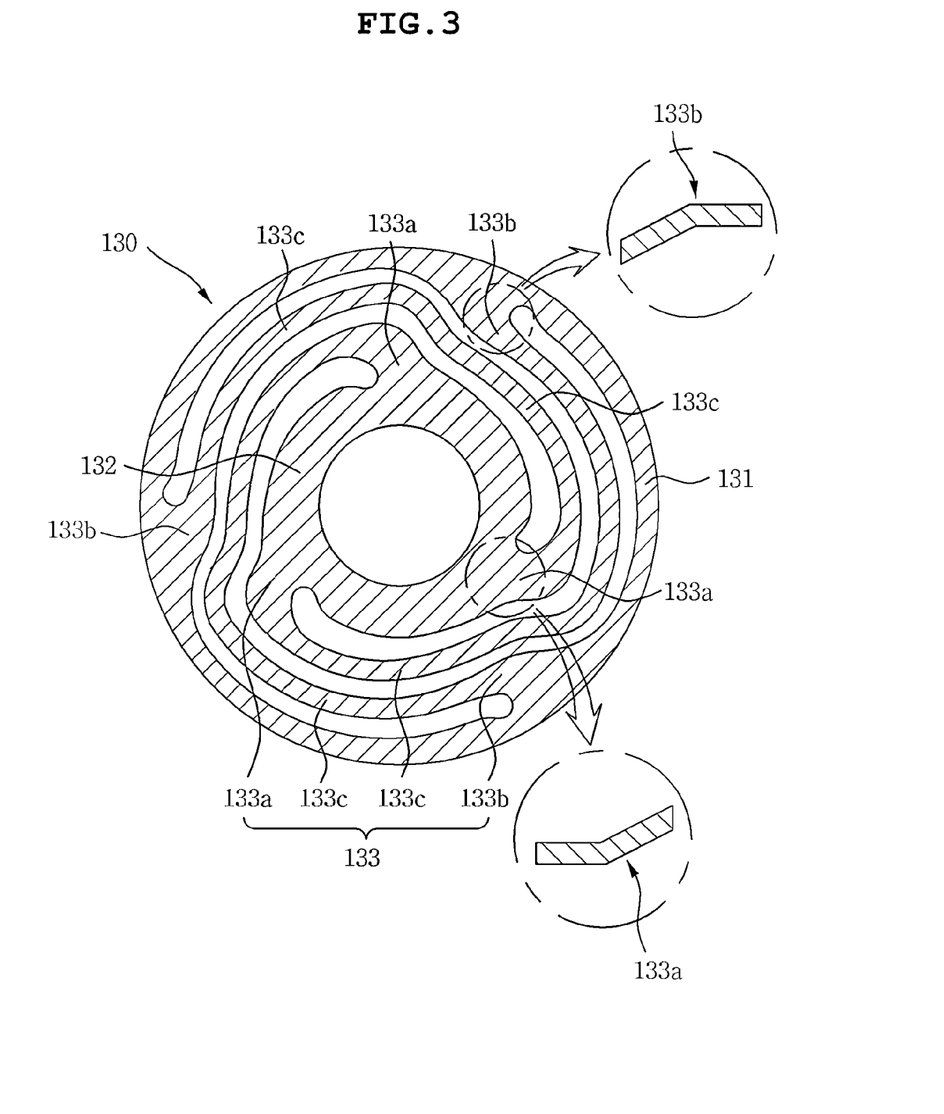
FIG. 3 is a plan view schematically showing an elastic member of the linear vibration motor shown in FIG. 1.

Further, the number of connection pieces 133 of the elastic member 130 may be three as shown in FIG. 3. In this case, a degree of freedom in design such as a welding part area, or the like, is improved. In addition, the number of connection pieces 122 may also be changed. For example, the number of connection pieces 122 may be two, four, and the like.

Further, in the elastic member 130, one of the upward bending part and the downward bending part may be formed or both of them may be formed.

Further, the number of connection pieces 133 of the elastic member 130 according to the preferred embodiment of the present invention may be three as shown in FIG. 3.

Through the above-mentioned configuration, when external power is supplied to the coil 121 through the wire 140, the vibrator part vibrates linearly by the electromagnetic force between the coil 121 and the first and second magnets 111a and 111b. Here, in the case in which displacement of the vibrator part 120 increases, friction due to contact between the vibrator part and the case 113 or the weight body 122 is blocked due to a predetermined height deviation by an optimal shape of the elastic member, that is, the upward bending part of the inner side connection part 133a and the downward bending part of the outer side connection part 133b to alleviate metallic high frequency noise and secure vibration displacement, thereby making it possible to improve product performance and yield.

Figure 4:
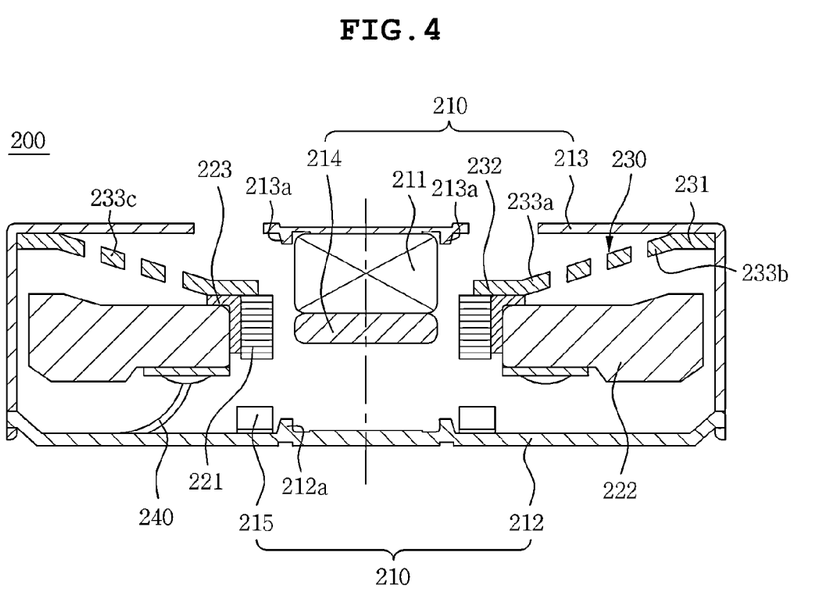
FIG. 4 is a cross-sectional view schematically showing a linear vibration motor according to a second preferred embodiment of the present invention.

FIG. 4 is a cross-sectional view schematically showing a linear vibration motor according to a second preferred embodiment of the present invention. As shown, the linear vibration motor 200 is different only in the number of magnets from the linear vibration motor 100 shown in FIG. 1.

More specifically, the linear vibration motor 200 is configured to include: a stator part 210 including a magnet 211, a bracket 212, a case 213, a yoke plate 214, and a damping member 215; a vibrator part 221 including a coil 222, a weight body 222, and a circular yoke 223; and an elastic member 230 connecting the stator part and the vibrator part to each other.

Further, the magnet 211, which is to vibrate the vibrator part by electromagnetic force with the coil 221, is disposed to face the coil of the vibrator part and is mounted on one surface of the case 213.

In addition, the elastic member 230 includes an outer ring 231, an inner ring 232, and connection pieces 233. Further, the connection piece 233 connects the inner ring 232 and the outer ring 231 to each other. That is, an outer side part of the inner ring 232 and an inner side part of the outer ring 231 are connected to each other by the connection piece 233.

In addition, the connection piece 233 includes an inner side connection part 233a connected to the inner ring 232, an outer side connection part 233b connected to the outer ring 231, and a connection ring part 233c connecting the inner side connection part 233a and the outer connection part 233b to each other. Further, the inner side connection part 233a is formed as an upward bending part in the vibration direction of the vibrator part, and the outer connection part 233b is formed as a downward bending part in the vibration direction of the vibrator part.

Figure 5:
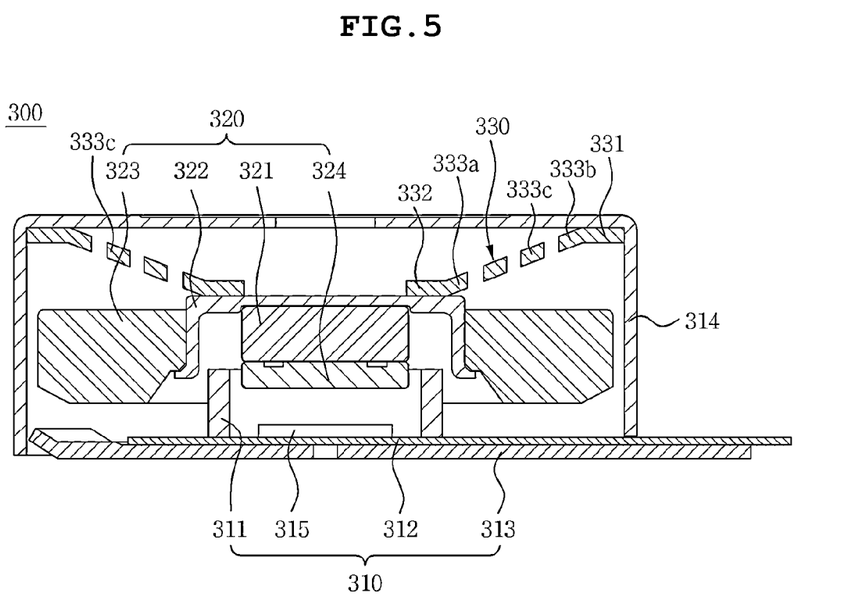
FIG. 5 is a cross-sectional view schematically showing a linear vibration motor according to a third preferred embodiment of the present invention.

FIG. 5 is a cross-sectional view schematically showing a linear vibration motor according to a third preferred embodiment of the present invention. As shown, the linear vibration motor 300 is configured to include a stator part 310, a vibrator part 320, and an elastic member 330 connecting the stator part and the vibrator part to each other.

More specifically, the stator part includes a coil 311, a printed circuit board 312 having the coil 311 coupled thereto, a bracket 313 having the printed circuit board 312 fixedly coupled thereto, and a case 314 provided with an internal space so as to cover the vibrator part and coupled to the bracket 313.

In addition, the vibrator part 320 includes a magnet 321 disposed to face the coil 311, a yoke 322 coupled to one surface of the magnet 321, a weight body 323 coupled to an outer peripheral surface of the yoke 322, and an elastic member 330 having one end coupled to the stator part and the other end coupled to the vibrator part.

The elastic member 330 is the same as the elastic member 130 shown in FIG. 3. Since a specific shape and a technical feature thereof have been described above, a description thereof will be omitted.

Figure 6:
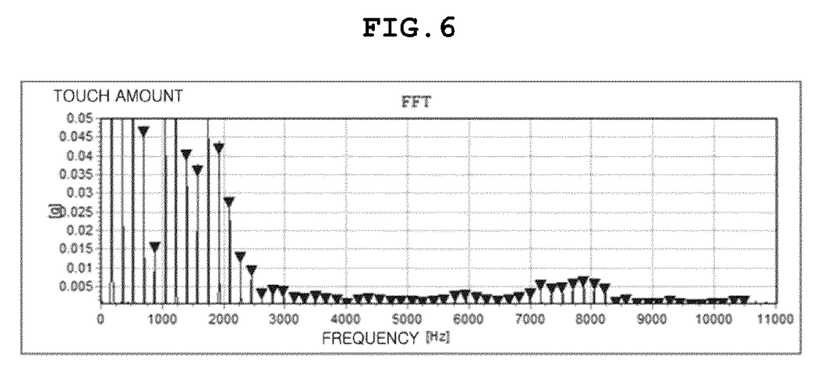
FIG. 6 is a graph showing a touch amount according to a frequency of the linear vibration motor according to the first preferred embodiment of the present invention.

FIG. 6 is a graph showing a touch amount according to a frequency of the linear vibration motor according to the first preferred embodiment of the present invention. It could be appreciated from FIG. 6 that a peak of a touch was not generated with reference to displacement of a frequency and a touch amount is reduced as compared to a touch amount according to a frequency in the linear vibration motor according to the prior art shown in FIG. 8.

Figure 7:
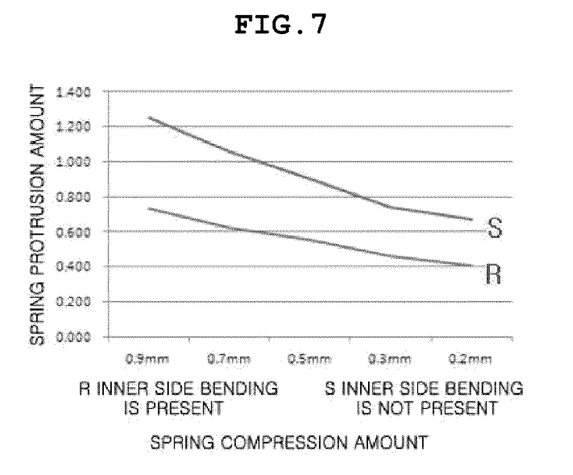
FIG. 7 is a graph in which compression amounts of elastic members according to the linear vibration motor according to the first preferred embodiment of the present invention and the linear vibration motor according to the prior art are compared with each other.

FIG. 7 is a graph in which compression amounts of elastic members according to the linear vibration motor according to the first preferred embodiment of the present invention and the linear vibration motor according to the prior art are compared with each other. In FIG. 7, R indicates a protrusion amount according to a compression amount of the elastic member that is provided with the upper bending part, which is the inner side connection part 133a, and S indicates a protrusion amount according to a compression amount of the elastic member that is not provided with the upper bending part, which is the inner side connection part 133a. It could be appreciated from FIG. 7 that the protrusion amount according to the compression amount of the elastic member that is provided with the upper bending part, which is the inner side connection part 133a is smaller than the protrusion amount according to the compression amount of the elastic member that is not provided with the upper bending part, such that touch noise and an abrasion rate may be significantly reduced.

As set forth above, with the linear vibration motor according to the preferred embodiments of the present invention, the elastic member solving a design restriction by having an improved shape is provided, thereby making it possible to reduce a touch and abrasion between components at the time of driving of the motor. In addition, the vibration displacement is secured, thereby making it possible to improve quality and performance of a product. Further, a welding space is secured, thereby making it possible to reduce a quality defect rate and significantly reduce a touch amount as compared to the prior art.

Although the preferred embodiments of the present invention have been disclosed for illustrative purposes, they are for specifically explaining the present invention and thus a linear vibration motor according to the present invention is not limited thereto, but those skilled in the art will appreciate that various modifications, additions and substitutions are possible, without departing from the scope and spirit of the invention as disclosed in the accompanying claims.

Accordingly, any and all modifications, variations or equivalent arrangements should be considered to be within the scope of the invention, and the detailed scope of the invention will be disclosed by the accompanying claims.

What is claimed is:

1. A linear vibration motor comprising:
a stator part including a magnet;
a vibrator part including a coil disposed to face the magnet; and
an elastic member connecting the stator part and the vibrator part to each other, wherein the elastic member includes bending parts formed in connection parts thereof connected to the stator part and the vibration part in a vibration direction of the vibrator part,
wherein:
the elastic member includes an outer ring coupled to the stator part, an inner ring disposed at an inner side of the outer ring and connected to the vibrator part, and one or more connection pieces connecting the outer ring and the inner ring to each other,
the connection piece includes:
an inner side connection part connected to the inner ring;
an outer side connection part connected to the outer ring; and
a connection ring part connecting the inner side connection part and the outer connection part to each other, and the inner side connection part is provided with an upward bending part in the vibration direction of the vibrator part, and the outer side connection part is provided with a downward bending part in the vibration direction of the vibrator part.

2. The linear vibration motor as set forth in claim 1, wherein each of the inner side connection part and the outer side connection part has an area wider than that of the connection ring part.

3. The linear vibration motor as set forth in claim 1, wherein the number of connection pieces connecting the inner ring and the outer ring to each other is three.

4. The linear vibration motor as set forth in claim 1, wherein the stator part includes:
   a case provided with an internal space receiving the vibrator part therein and provided with an open part;
   a bracket coupled to the case so as to cover the open part of the case; and
   at least one magnet mounted on the case and the bracket.

5. The linear vibration motor as set forth in claim 4, wherein the magnet includes:
   a first magnet coupled to one surface of the case; and a second magnet facing the first magnet and coupled to one surface of the bracket.

6. The linear vibration motor as set forth in claim 5, wherein the stator part further includes a yoke plate selectively mounted on one surface of the first magnet or the second magnet facing each other.

7. The linear vibration motor as set forth in claim 1, wherein the vibrator part includes:
   a coil disposed to face the magnet; and
   a weight body coupled to the coil, and
   wherein the elastic member is selectively coupled to the coil or the weight body.

8. The linear vibration motor as set forth in claim 7, wherein the vibrator part further includes a circular yoke coupled to an outer peripheral surface of the coil, and wherein the elastic member is coupled to the circular yoke.

9. The linear vibration motor as set forth in claim 7, wherein each of the coil and the weight body is provided with a hollow part so as to be linearly movable in a state in which the stator part is disposed therein.

10. A linear vibration motor comprising:
    a stator part including a coil and a printed circuit board coupled to the coil;
    a vibrator part including a magnet disposed to face the coil and a weight body coupled to the magnet; and
    an elastic member connecting the stator part and the vibrator part to each other,
    wherein:
       the elastic member includes bending parts formed in connection parts thereof connected to the stator part and the vibration part in a vibration direction of the vibrator part,
       the elastic member includes an outer ring coupled to the stator part, an inner ring disposed at an inner side of the outer ring and connected to the vibrator part, and one or more connection pieces connecting the outer ring and the inner ring to each other,
       the connection piece includes:
          an inner side connection part connected to the inner ring;
          an outer side connection part connected to the outer ring; and
          a connection ring part connecting the inner side connection part and the outer connection part to each other, and
       the inner side connection part is provided with an upward bending part in the vibration direction of the vibrator part, and the outer side connection part is provided with a downward bending part in the vibration direction of the vibrator part.

11. The linear vibration motor as set forth in claim 10, wherein the stator part further includes a bracket having the printed circuit board fixedly coupled thereto and a case provided with an internal space so as to cover the vibrator part and coupled to the bracket.

* * * * *